(12) United States Patent
Sakota et al.

(10) Patent No.: US 11,248,612 B2
(45) Date of Patent: Feb. 15, 2022

(54) CENTRIFUGAL COMPRESSOR WITH GAS AND LIQUID COOLING LINES

(71) Applicant: IHI Corporation, Tokyo (JP)

(72) Inventors: Koji Sakota, Tokyo (JP); Nobuyuki Ikeya, Tokyo (JP); Hideumi Ohkuma, Tokyo (JP); Naomi Sawachika, Tokyo (JP)

(*) Notice: Subject to any disclaimer, the term of this patent is extended or adjusted under 35 U.S.C. 154(b) by 0 days.

(21) Appl. No.: 16/862,571

(22) Filed: Apr. 30, 2020

(65) Prior Publication Data

US 2020/0256344 A1  Aug. 13, 2020

Related U.S. Application Data

(63) Continuation of application No. PCT/JP2018/039363, filed on Oct. 23, 2018.

(30) Foreign Application Priority Data

Nov. 1, 2017  (JP) .............................. JP2017-211849

(51) Int. Cl.
  *F04D 25/08*  (2006.01)
  *F04D 17/10*  (2006.01)
  (Continued)

(52) U.S. Cl.
  CPC ........... *F04D 17/10* (2013.01); *F01D 17/141* (2013.01); *F04D 25/0613* (2013.01);
  (Continued)

(58) Field of Classification Search
  CPC .... F04D 17/10; F04D 17/141; F04D 25/0606; F04D 25/0613; F04D 25/08;
  (Continued)

(56) References Cited

U.S. PATENT DOCUMENTS 4,125,345 A * 11/1978 Yoshinaga .............. F04D 17/12
                                              415/179
5,250,863 A  10/1993 Brandt
          (Continued)

FOREIGN PATENT DOCUMENTS

CN   2916210    6/2007
CN   101793257  8/2010
          (Continued)

OTHER PUBLICATIONS

International Preliminary Report on Patentability with Written Opinion dated May 14, 2020 for PCT/JP2018/039363.
          (Continued)

*Primary Examiner* — Ninh H. Nguyen
(74) *Attorney, Agent, or Firm* — Soei Patent & Law Firm (57) ABSTRACT

A centrifugal compressor includes a motor that rotates a rotary shaft of a compressor impeller, a motor housing that houses the motor, a compressor housing that houses the compressor impeller and includes an intake port and a discharge port, an gas bleed port that is provided closer to the discharge port than the compressor impeller in a flow direction in the compressor housing, a cooling gas line which is connected to the gas bleed port and through which a part of compressed gas compressed by the compressor impeller passes, a cooling liquid line of which at least a part is provided in the motor housing and through which cooling liquid of which the temperature is lower than the temperature of the compressed gas passes, and a heat exchanger that is disposed on the cooling gas line and the cooling liquid line.

22 Claims, 4 Drawing Sheets

(51) Int. Cl.
  *F01D 17/14* (2006.01)
  *F04D 29/056* (2006.01)
  *F04D 29/42* (2006.01)
  *F04D 29/58* (2006.01)
  *F04D 25/06* (2006.01)

(52) U.S. Cl.
  CPC ........... *F04D 25/08* (2013.01); *F04D 29/056* (2013.01); *F04D 29/42* (2013.01); *F04D 29/582* (2013.01); *F04D 29/5806* (2013.01); *F04D 29/5813* (2013.01); *F04D 29/5826* (2013.01); *F05D 2220/30* (2013.01); *F05D 2250/52* (2013.01); *F05D 2260/213* (2013.01); *F05D 2260/606* (2013.01)

(58) Field of Classification Search
  CPC .... F04D 29/056; F04D 29/42; F04D 29/5806; F04D 29/5813; F04D 29/582; F04D 29/5826; F05D 2260/213; F05D 2260/606
  See application file for complete search history.

(56) References Cited

U.S. PATENT DOCUMENTS

| | | | |
|---|---|---|---|
| 6,102,672 | A | 8/2000 | Woollenweber et al. |
| 8,523,540 | B2 * | 9/2013 | Eide .................. F04D 13/086 417/423.8 |
| 10,808,723 | B2 | 10/2020 | Nagao et al. |
| 11,143,204 | B2 | 10/2021 | Park et al. |
| 2008/0141679 | A1 | 6/2008 | Behaghel et al. |
| 2009/0028730 | A1 | 1/2009 | Radermacher et al. |
| 2009/0056681 | A1 | 3/2009 | Shibui et al. |
| 2011/0097222 | A1 | 4/2011 | Komatsu et al. |
| 2011/0150637 | A1 | 6/2011 | Radermacher et al. |
| 2011/0239694 | A1 | 10/2011 | Sugitani et al. |
| 2014/0144412 | A1 | 5/2014 | An et al. |
| 2015/0308456 | A1 * | 10/2015 | Thompson .......... F04D 29/5806 417/244 |
| 2016/0032931 | A1 | 2/2016 | Lee |
| 2016/0102677 | A1 | 4/2016 | An et al. |
| 2017/0211595 | A1 | 7/2017 | Bertoneri et al. |
| 2017/0328269 | A1 * | 11/2017 | Yamashita ............ F04D 29/584 |

FOREIGN PATENT DOCUMENTS

| | | |
|---|---|---|
| CN | 201934335 | 8/2011 |
| CN | 102213221 | 10/2011 |
| CN | 103174678 | 6/2013 |
| CN | 104653478 | 5/2015 |
| CN | 106104006 | 11/2016 |
| CN | 106460863 | 2/2017 |
| CN | 206268135 | 6/2017 |
| DE | 4222394 | 12/1993 |
| EP | 2314878 | 11/2016 |
| EP | 3128184 | 2/2017 |
| JP | S63-277821 | 11/1988 |
| JP | H3-015696 | 1/1991 |
| JP | H4-099418 | 8/1992 |
| JP | H5-033667 | 2/1993 |
| JP | 2001-200791 | 7/2001 |
| JP | 2007-040255 | 2/2007 |
| JP | 2008-025577 | 2/2008 |
| JP | 2009-097519 | 5/2009 |
| JP | 2010-151034 | 7/2010 |
| JP | 2010-196478 | 9/2010 |
| JP | 2011-089459 | 5/2011 |
| JP | 2011-089549 | 5/2011 |
| JP | 2011-202588 | 10/2011 |
| JP | 2011-202589 | 10/2011 |
| JP | 2012-062778 | 3/2012 |
| JP | 2012-246931 | 12/2012 |
| JP | 2013-024041 | 2/2013 |
| JP | 2014-058935 | 4/2014 |
| SE | 467752 | 9/1992 |
| WO | 2013/187786 | 12/2013 |

OTHER PUBLICATIONS

International Preliminary Report on Patentability with Written Opinion dated May 14, 2020 for PCT/JP2018/039371.
SOEI Patent and Law Firm, Statement of Related Matters, dated Jul. 10, 2020.
International Search Report dated Jan. 22, 2019 for PCT/JP2018/039363.
International Search Report dated Jan. 22, 2019 for PCT/JP2018/039371.
International Search Report dated Jan. 22, 2019 for PCT/JP2018/039913.

* cited by examiner

CENTRIFUGAL COMPRESSOR WITH GAS AND LIQUID COOLING LINES

CROSS-REFERENCE TO RELATED APPLICATIONS

This application is a continuation application of PCT Application No. PCT/JP2018/039363, filed Oct. 23, 2018, which claims the benefit of priority from Japanese Patent Application No. 2017-211849, filed Nov. 1, 2017 the entire contents of which are incorporated herein by reference.

BACKGROUND

Japanese Unexamined Patent Publication No. 2010-196478 and Japanese Unexamined Patent Publication No. 2012-62778 describe a centrifugal compressor, such as an electric supercharger, including a cooling structure that circulates cooling oil to cool a motor provided in a motor housing.

SUMMARY

An example centrifugal compressor disclosed herein includes a motor that rotates a rotary shaft of a compressor impeller, a motor housing that houses the motor, a compressor housing that houses the compressor impeller and includes an intake port and a discharge port, and a gas bleed port that is provided closer to the discharge port than the compressor impeller in a flow direction in the compressor housing. Additionally, the centrifugal compressor may include a cooling gas line which is connected to the gas bleed port and through which a part of compressed gas compressed by the compressor impeller passes, and a cooling liquid line of which at least a part is provided in the motor housing and through which cooling liquid of which the temperature is lower than the temperature of the compressed gas passes. The cooling gas line and the cooling liquid line pass through a heat exchanger.

Another example centrifugal compressor includes a compressor housing that houses a compressor impeller, a cooling gas line that extracts a part of compressed gas present in the compressor housing from the compressor housing, and a cooling liquid line through which cooling liquid of which the temperature is lower than the temperature of the compressed gas passes. A heat exchanger exchanges heat between the cooling gas line and the cooling liquid line.

DETAILED DESCRIPTION

An example centrifugal compressor may include a motor that rotates a rotary shaft of a compressor impeller, a motor housing that houses the motor, a compressor housing that houses the compressor impeller and includes an intake port and a discharge port, a gas bleed port that is provided closer to the discharge port than the compressor impeller in a flow direction in the compressor housing, a cooling gas line which is connected to the gas bleed port, and a cooling liquid line of which at least a part is provided in the motor housing. Additionally, the cooling gas line and the cooling liquid line may pass through a heat exchanger.

Gas compressed by the compressor impeller passes through the cooling gas line, and cooling liquid passes through the cooling liquid line. The temperature of the cooling liquid may be lower than the temperature of the compressed gas. Further, the compressed gas passing through the cooling gas line within the heat exchanger is cooled by the exchange of heat with the cooling liquid passing through the cooling liquid line. As a result, the inside of the centrifugal compressor can be cooled using the compressed gas passing through the cooling gas line and the cooling liquid passing through the cooling liquid line. Using both the compressed gas and the cooling liquid as a refrigerant for cooling the inside of the centrifugal compressor may be used to provide efficient and compact cooling of the centrifugal compressor, as compared to centrifugal compressors which are cooled entirely by cooling liquid.

In some examples, the cooling liquid line may include a motor cooling portion that is disposed along a stator of the motor and a bearing cooling portion that is disposed along a bearing supporting the rotary shaft. Additionally, the motor cooling portion may be a flow passage that is wound around the stator, and the bearing cooling portion may be a flow passage that is disposed along an end portion of the stator and is disposed along the circumference of the bearing. The cooling liquid line including the motor cooling portion and the bearing cooling portion may be used to effectively cool both the stator and the bearing.

In some examples, the length of a flow passage cross-section of the motor cooling portion in a direction along the rotary shaft may be longer than that in a direction orthogonal to the rotary shaft, and the length of a flow passage cross-section of the bearing cooling portion in the direction along the rotary shaft may be shorter than that in the direction orthogonal to the rotary shaft. Since the flow passage cross-section of the motor cooling portion is longer in the direction along the rotary shaft, the region of the motor cooling portion facing the stator is made wider around the stator in order to achieve the efficient cooling of the stator. Further, the flow passage cross-section of the motor cooling portion is shorter in the direction orthogonal to the rotary shaft, and the flow passage cross-section of the bearing cooling portion is shorter in the direction along the rotary shaft. By limiting or reducing the dimensions in the direction orthogonal to the rotary shaft and in the direction along the rotary shaft, the overall size of the centrifugal compressor may be decreased.

In some examples, the cooling liquid line may include an inlet or entry port, an outlet port, and a flow passage (one-path flow passage) that directly connects the entry port to the discharge port in one path (a single flow path). The entry port is provided to a downstream side relative to the heat exchanger and is provided to an upstream side relative to the stator. The discharge port is provided to the downstream side relative to the stator. In some examples, the cooling liquid flows toward the downstream side after having exchanged heat with the stator in the one-path flow passage, without returning to the upstream side.

The centrifugal compressor may further include an inverter that controls the rotation of the motor, and the cooling liquid line may include an inverter cooling portion that is disposed along the inverter. In some examples, the heat exchanger may be disposed on an upstream side relative to the stator in a flow direction of the cooling liquid, and the inverter may be disposed on a downstream side relative to the stator. The stator and the inverter may both be cooled using the cooling liquid having exchanged heat with the stator.

The centrifugal compressor may include a compressor housing that houses a compressor impeller, a cooling gas line that extracts a part of compressed gas present in the compressor housing from the compressor housing, and a cooling liquid line. In some examples, the temperature of the cooling liquid that passes through the cooling liquid line is lower than the temperature of the compressed gas that passes through the cooling gas line. Additionally, the cooling gas line may be configured to exchange heat with the cooling liquid line in a heat exchanger.

In some examples, the inside of the centrifugal compressor can be cooled using the compressed gas passing through the cooling gas line and the cooling liquid passing through the cooling liquid line. Using both the compressed gas and the cooling liquid as a refrigerant for cooling the inside of the centrifugal compressor may result in efficient and compact cooling of the centrifugal compressor as compared to centrifugal compressors which are cooled entirely by cooling liquid.

Hereinafter, with reference to the drawings, the same elements or similar elements having the same function are denoted by the same reference numerals, and redundant description will be omitted.

Figure 1:
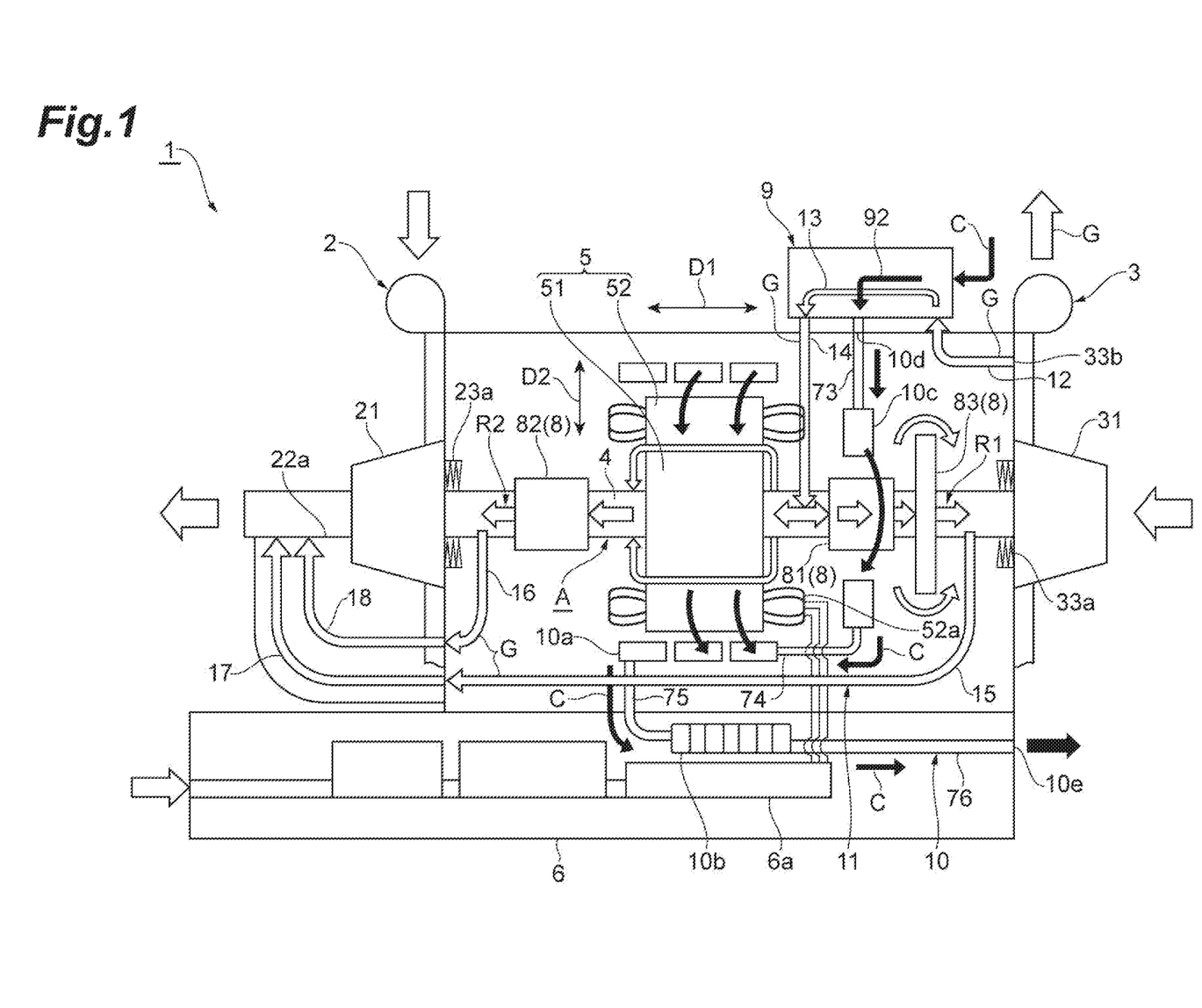
FIG. 1 is an explanatory diagram schematically illustrating an example centrifugal compressor.

An example centrifugal compressor 1 is illustrated in FIG. 1. In some examples, the centrifugal compressor 1 may comprise an electric supercharger. The centrifugal compressor 1 centrifugal compressor 1 may be configured for use with, for example, a fuel cell system. The fuel cell system may be, for example, a polymer electrolyte fuel cell (PEFC), a phosphoric acid fuel cell (PAFC), or the like.

Figure 2:
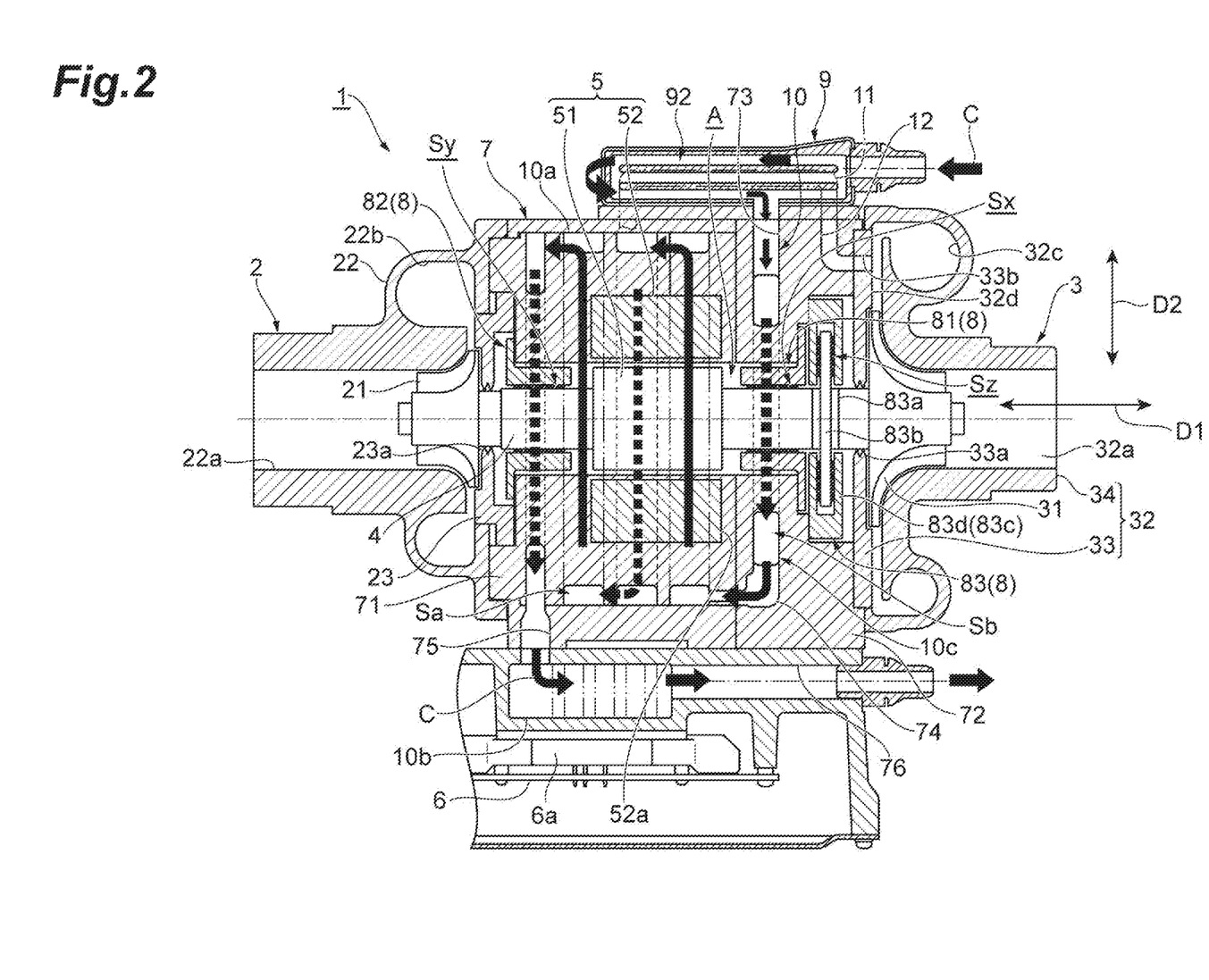
FIG. 2 is a cross-sectional view illustrating the example centrifugal compressor of FIG. 1.

As illustrated in FIGS. 1 and 2, the centrifugal compressor 1 includes a turbine 2, a compressor 3, and a rotary shaft 4 of which both ends are provided with the turbine 2 and the compressor 3. A electric motor 5 for applying drive torque to the rotary shaft 4 is installed between the turbine 2 and the compressor 3. Compressed air (or other types of "compressed gas") G, which is compressed by the compressor 3, is supplied to the fuel cell system (not illustrated) as an oxidant (oxygen). Electricity is generated in the fuel cell system by a chemical reaction between fuel and the oxidant. Air containing water vapor is discharged from the fuel cell system, and is supplied to the turbine 2.

The centrifugal compressor 1 rotates a turbine impeller 21 of the turbine 2 using high-temperature air discharged from the fuel cell system. When the turbine impeller 21 is rotated, a compressor impeller 31 of the compressor 3 is rotated and the compressed air G is supplied to the fuel cell system. Additionally, in the centrifugal compressor 1, most of the drive force of the compressor 3 may be applied by the motor 5. Accordingly, the centrifugal compressor 1 may be configured as an electric supercharger that is substantially driven by an electric motor.

The fuel cell system and the centrifugal compressor 1 may be mounted on, for example, a vehicle (electric automobile). Meanwhile, electricity generated in the fuel cell system may be supplied to the motor 5 of the centrifugal compressor 1, but electricity may be supplied to the motor 5 from systems other than the fuel cell system.

The centrifugal compressor 1 includes the turbine 2, the compressor 3, the rotary shaft 4, the motor 5, and an inverter 6 that controls the rotational drive of the motor 5.

The turbine 2 includes a turbine housing 22 and a turbine impeller 21 housed in the turbine housing 22. The compressor 3 includes a compressor housing 32 and a compressor impeller 31 housed in the compressor housing 32. The turbine impeller 21 is provided at one end (e.g., a first end) of the rotary shaft 4, and the compressor impeller 31 is provided at the other end (e.g., a second end) of the rotary shaft 4.

A motor housing 7 is provided between the turbine housing 22 and the compressor housing 32. The rotary shaft 4 is rotatably supported via an air bearing structure (or other type of "gas bearing structure") 8 by the motor housing 7.

The turbine housing 22 is provided with an exhaust gas inlet and an exhaust gas outlet 22a. Air, which contains water vapor and is discharged from the fuel cell system, flows into the turbine housing 22 through the exhaust gas inlet. The air flowing in passes through a turbine scroll flow passage 22b and is supplied to the inlet side of the turbine impeller 21. The turbine impeller 21 (for example, a radial turbine) generates torque using the pressure of the supplied air. After that, the air flows out of the turbine housing 22 through the exhaust gas outlet 22a.

Figure 3:
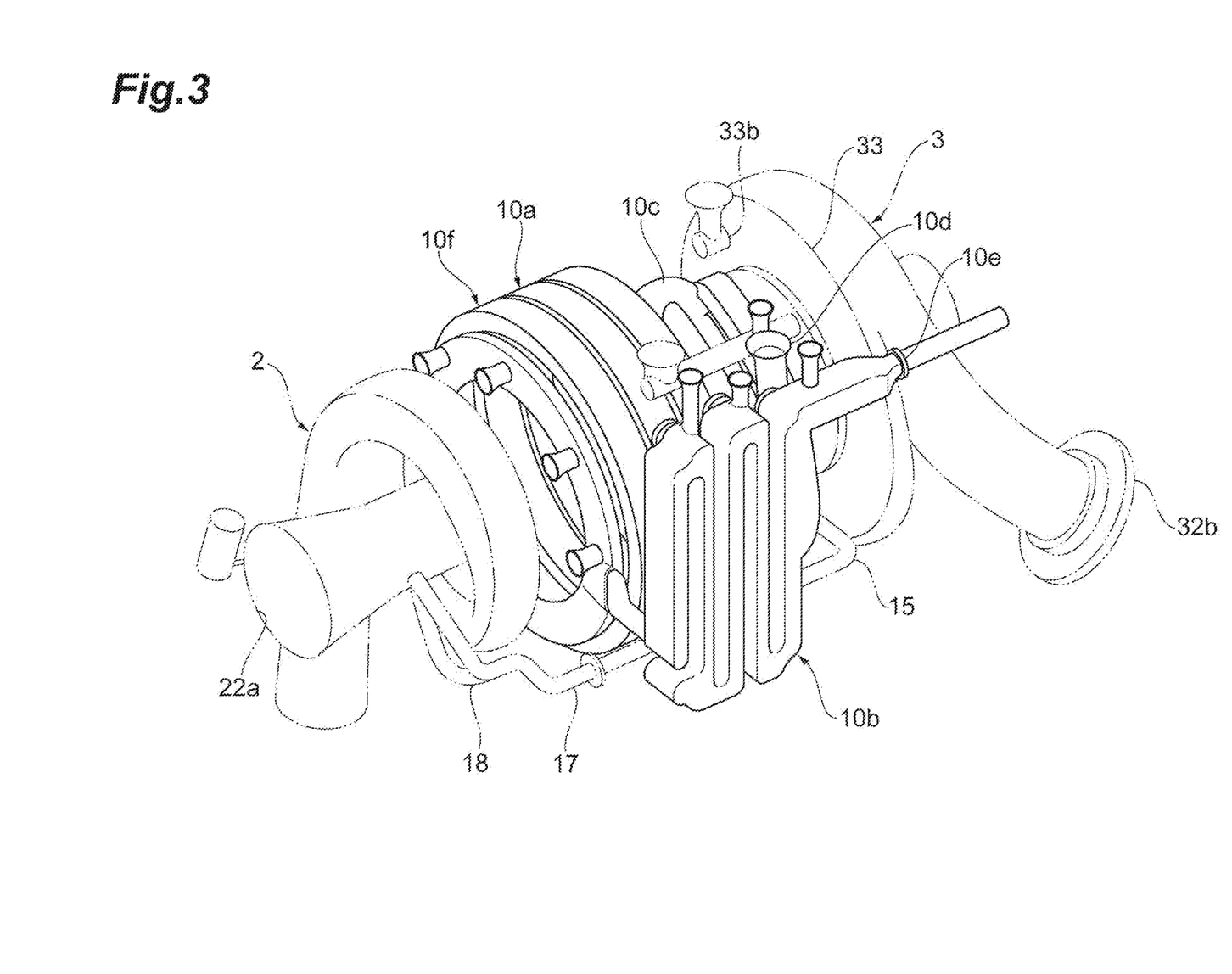
FIG. 3 is a perspective view of an example refrigerant line and an example air-cooling line viewed from the inverter side of a centrifugal compressor.

The compressor housing 32 is provided with an intake port or air intake port 32a and a discharge port 32b (see FIG. 3). When the turbine impeller 21 is rotated as described above, the rotary shaft 4 and the compressor impeller 31 are rotated. The compressor impeller 31, which is being rotated, takes in outside air through the intake port 32a and compresses the outside air. The compressed air G compressed by the compressor impeller 31 passes through a compressor scroll flow passage 32c and is discharged from the discharge port 32b. The compressed air G discharged from the discharge port 32b is supplied to the fuel cell system.

The motor 5 "for example, a brushless AC motor) includes a rotor 51 as a rotating element and a stator 52 as a stationary element. The rotor 51 includes one or more magnets. The rotor 51 is fixed to the rotary shaft 4, and can be rotated about an axis together with the rotary shaft 4. The rotor 51 is disposed at the middle portion of the rotary shaft 4 in the direction of the axis of the rotary shaft 4. The stator 52 includes a plurality of coils and an iron core. The stator 52 surrounds the rotor 51 in the circumferential direction of the rotary shaft 4. The stator 52 generates a magnetic field around the rotary shaft 4, and rotates the rotary shaft 4 in cooperation with the rotor 51.

An example cooling structure includes a heat exchanger 9 that is mounted on the motor housing 7, a refrigerant line (or "refrigerant flow passage") 10 that includes a flow passage passing through the heat exchanger 9, and an air-cooling line (or "cooling gas line") 11. The refrigerant line 10 and the air-cooling line 11 are connected or fluidly coupled to each other so that heat can be exchanged in the heat exchanger 9. A part of the compressed air G compressed by the compressor 3 passes through the air-cooling line 11. Additionally, a coolant C (or "cooling liquid") of which the temperature is lower than the temperature of the compressed air G passing through the air-cooling line 11, passes through the refrigerant line 10.

The air-cooling line 11 extracts and transfers a part of the compressed air G compressed by the compressor 3. The centrifugal compressor 1 is configured so that pressure on the side of the compressor 3 is higher than pressure on the side of the turbine 2. The air-cooling line 11 has a structure that cools the air bearing structure 8 by using a difference between the pressure on the side of the compressor 3 and the pressure on the side of the turbine 2. That is, the air-cooling line 11 extracts a part of the compressed air G compressed by the compressor 3, guides the compressed air G to the air bearing structure 8, and sends the compressed air G having passed through the air bearing structure 8 to the turbine 2. Additionally, the temperature of the compressed air G that is in the range of 150° C. to 250° C., is made to fall to the range of about 70° C. to 110° C. by the heat exchanger 9, and in some examples is made to fall to the range of about 70° C. to 80° C. By maintaining the temperature of the air bearing structure 8 at 150° C. or more, the air bearing structure 8 can be cooled by the supply of the compressed air G. The air-cooling line 11 will be described in additional detail below.

The motor housing 7 includes a stator housing 71 that houses the stator 52 surrounding the rotor 51, and a bearing housing 72 that is provided with the air bearing structure 8. A shaft space A where the rotary shaft 4 penetrates is formed in the stator housing 71 and the bearing housing 72. Labyrinth structures 33a and 23a for making the inside of the shaft space A be kept airtight are provided at both end portions of the shaft space A.

The compressor housing 32 is fixed to the bearing housing 72. The compressor housing 32 includes an impeller chamber 34 that houses the compressor impeller 31, and a diffuser plate 33 that forms a diffuser flow passage 32d in cooperation with the impeller chamber 34. The impeller chamber 34 includes an intake port 32a that takes in air, a discharge port 32b (see FIG. 3) that discharges the compressed air G compressed by the compressor impeller 31, and a compressor scroll flow passage 32c that is provided on the downstream side of the diffuser flow passage 32d in the flow direction of the compressed air G.

The diffuser plate 33 is provided with the labyrinth structure 33a. Further, a gas bleed port 33b through which a part of the compressed air G passes is formed in the diffuser plate 33. The gas bleed port 33b is provided closer to the discharge port 32b, that is, the downstream side relative to the compressor impeller 31 in the flow direction in the compressor housing 32, and is an inlet of the air-cooling line 11. The gas bleed port 33b is connected or fluidly coupled to a first communication flow passage 12 provided in the bearing housing 72. The first communication flow passage 12 is connected or fluidly coupled to the heat exchanger 9. The heat exchanger 9 is mounted on the outer peripheral surface of the motor housing 7.

The heat exchanger 9 is provided with an air flow passage 13 (see FIG. 1) through which the compressed air G passes and a liquid flow passage 92 through which the coolant C passes. The air flow passage 13 and the liquid flow passage 92 are connected or located adjacent to each other so that heat can be exchanged. The air flow passage 13 is a part of the air-cooling line 11, and the liquid flow passage 92 is a part of the refrigerant line 10. Accordingly, the heat exchanger 9 may be understood to provide for the heat exchange between the air-cooling line 11 and the refrigerant line 10.

The outlet of the air flow passage 13 is connected or fluidly coupled to a second communication flow passage 14. The second communication flow passage 14 is provided in the motor housing 7. The second communication flow passage 14 is connected or fluidly coupled to the air bearing structure 8 disposed in the shaft space A.

The example air bearing structure 8 is now described in additional detail. The air bearing structure 8 includes a pair of radial bearings 81 and 82 and a thrust bearing 83.

The pair of radial bearings 81 and 82 restricts the movement of the rotary shaft 4 in a direction D2 orthogonal to the rotary shaft 4 while allowing the rotation of the rotary shaft 4. The pair of radial bearings 81 and 82 may comprise dynamic pressure air bearings which are disposed with the rotor 51, so that the rotor 5 is provided at the middle portion of the rotary shaft 4 and is interposed between the pair of radial bearings 81 and 82.

The pair of radial bearings 81 and 82 includes a first radial bearing 81 disposed between the rotor 51 and the compressor impeller 31, and second radial bearing 82 disposed between the rotor 51 and the turbine impeller 21. In some examples, the first radial bearing 81 and the second radial bearing 82 have substantially the same structure, and so the first radial bearing 81 will be described as representative of the pair of radial bearings 81 and 82.

The first radial bearing 81 has a structure that introduces ambient air into a space between the rotary shaft 4 and the first radial bearing 81 (wedge effect) as a result of the rotation of the rotary shaft 4, increases pressure, and obtains a load capacity. The first radial bearing 81 supports the rotary shaft 4 by the load capacity obtained from the wedge effect while allowing the rotary shaft 4 to be rotatable.

In some examples, a first air-cooling gap Sx comprising an air layer is formed between the first radial bearing 81 and the rotary shaft 4 by the wedge effect and the compressed air G passes through this gap Sx. This first air-cooling gap Sx forms a part of the air-cooling line 11. Likewise, even in the case of the second radial bearing 82, a second air-cooling gap Sy comprising an air layer is formed between the second radial bearing 82 and the rotary shaft 4 by a wedge effect and the compressed air G passes through this gap Sy. This second air-cooling gap Sy also forms a part of the air-cooling line 11.

The thrust bearing 83 restricts the movement of the rotary shaft 4 in the direction of the axis of the rotary shaft 4 while allowing the rotation of the rotary shaft 4. The thrust bearing 83 may comprise a dynamic pressure air bearing that is disposed between the first radial bearing 81 and the compressor impeller 31.

The thrust bearing 83 has a structure that introduces ambient air into a space between the rotary shaft 4 and the thrust bearing 83 (wedge effect) as a result of the rotation of the rotary shaft 4, increases pressure, and obtains load capacity. The thrust bearing 83 supports the rotary shaft 4 by the load capacity obtained from the wedge effect while allowing the rotary shaft 4 to be rotatable.

The thrust bearing 83 includes, for example, a thrust collar 83a that is fixed to the rotary shaft 4 and an annular bearing body 83c that is fixed to the bearing housing 72. The thrust collar 83a includes a disc-shaped collar pad 83b. The bearing body 83c includes a pair of bearing pads 83d that is provided on both surfaces of the collar pad 83b to face each other.

The collar pad 83b and the bearing pads 83d generate a wedge effect in cooperation with each other. A third air-cooling gap Sz comprising an air layer is formed between the collar pad 83b and each of the bearing pads 83d by this wedge effect. This third air-cooling gap Sz forms a part of the air-cooling line 11 through which the compressed air G passes.

The second communication flow passage 14 (see FIG. 1) is connected or fluidly coupled to the shaft space A into which the rotary shaft 4 is inserted. The compressed air G supplied to the shaft space A branches in two directions along the rotary shaft 4, and one branch of the compressed air reaches the first radial bearing 81 and the other branch thereof reaches the second radial bearing 82. In some examples, the air-cooling line 11 branches in two directions in the shaft space A, including a first branch flow passage R1 that is connected to the first radial bearing 81, and a second branch flow passage R2 that is connected to the second radial bearing 82.

The first radial bearing 81 and the thrust bearing 83 are disposed on the first branch flow passage R1. The second radial bearing 82 is disposed on the second branch flow passage R2. The compressed air G passing through the first branch flow passage R1 mainly cools the first radial bearing 81 and the thrust bearing 83. The compressed air G passing through the second branch flow passage R2 mainly cools the second radial bearing 82.

The first branch flow passage R1 is connected or fluidly coupled to a third communication flow passage 15. The third communication flow passage 15 is connected or fluidly coupled to the exhaust gas outlet 22a of the turbine housing 22 through a fifth communication flow passage 17 that is formed in the turbine housing 22. Further, the second branch flow passage R2 is connected or fluidly coupled to a fourth communication flow passage 16. The fourth communication flow passage 16 is connected or fluidly coupled to the exhaust gas outlet 22a of the turbine housing 22 through a sixth communication flow passage 18 that is formed in the turbine housing 22.

The refrigerant line 10 (see FIG. 2) is a part of a circulation line that is connected or fluidly coupled to a radiator provided outside the centrifugal compressor 1. The temperature of the coolant C passing through the refrigerant line 10 is in the range of 50° C. to 100° C. The refrigerant line 10 is basically formed of a groove for a flow passage provided in the motor housing 7, or the like, and is appropriately provided with a seal material and the like to form a flow passage that is liquid-tight and closed. The refrigerant line 10 includes a motor cooling portion 10a disposed along the stator 52, an inverter cooling portion 10b disposed along the inverter 6, and a bearing cooling portion 10c disposed along the first radial bearing 81 and the thrust bearing 83 that are a part of the air bearing structure 8. Additionally, the entire refrigerant line 10 may be provided in the motor housing 7, and the refrigerant line 10 may be appropriately formed using separate pipes and the like.

The outlet of the liquid flow passage 92 passing through the heat exchanger 9 is connected or fluidly coupled to the bearing cooling portion 10c through a first connecting flow passage 73. The bearing cooling portion 10c includes a flow passage that is disposed along an end portion 52a of the stator 52. The end portion 52a of the stator 52 may include an end portion of a coil, which is wound on the iron core, in the direction of the rotary shaft 4. The bearing cooling portion 10c may be disposed along the end portion 52a of the stator 52 in order to cool the end portion 52a of the stator 52. The bearing cooling portion may be disposed along the end portion of the stator in order to exchange heat with the end portion 52a of the stator 52. When a region of the stator 52 forming the end portion 52a is translated in the direction of the axis of the rotary shaft 4, at least a part of the bearing cooling portion 10c is disposed on the movement trajectory of the region of the stator.

Further, the flow passage cross-section Sb of the bearing cooling portion 10c has a substantially rectangular shape, and the length of the flow passage cross-section Sb in a direction D1 along the rotary shaft 4 is shorter than the length of the flow passage cross-section Sb in a direction D2 orthogonal to the rotary shaft 4. By reducing the size of the flow passage cross-section Sb caused by the formation of the bearing cooling portion 10c, for example in the direction D1 along the rotary shaft 4, the size of the motor housing 7 may also be reduced. In some examples, the flow passage cross-section Sb of the bearing cooling portion 10c includes a cross-section orthogonal to the flow direction of the coolant C.

Furthermore, the bearing cooling portion 10c includes a flow passage that is disposed along the circumference of the first radial bearing 81. For example, the bearing cooling portion 10c may include a flow passage that is wound around the first radial bearing 81 to surround at least a part of the first radial bearing 81. Moreover, the bearing cooling portion 10c is disposed along the thrust collar 83a of the thrust bearing 83, and is additionally disposed between the end portion 52a of the stator 52 and the thrust bearing 83. The bearing cooling portion 10c is wound around the first radial bearing 81 to cool the first radial bearing 81. Further, the bearing cooling portion 10c is disposed along the thrust bearing 83 to cool of the thrust bearing 83.

In some examples, the bearing cooling portion is wound around the first radial bearing once. However, in other examples, the bearing cooling portion may be wound around the first radial bearing 81 plural times. Moreover, the bearing cooling portion may be wound around the first radial bearing less than once, for example where the bearing cooling portion is wound around at least a half of the first radial bearing 81. Additionally, the bearing cooling portion 10c may be disposed along the circumference of any one of the first radial bearing 81, the thrust bearing 83, the second radial bearing 82, or another bearing.

The bearing cooling portion 10c is connected to the motor cooling portion 10a through a second connecting flow passage 74. The motor cooling portion 10a includes a flow passage that is wound around the stator 52. For example, the motor cooling portion 10a includes a flow passage that is wound to surround the stator 52 over the turbine 2 from the compressor 3. In some examples, the motor cooling portion 10a may be wound around the stator 52 three times, and in other examples the motor cooling portion 10a may be wound around the stator 52 one or more times. Further, the motor cooling portion may be wound around the stator less than once, for example the motor cooling portion may be wound around at least half of the stator 52.

The flow passage cross-section Sa of the motor cooling portion 10a has a substantially rectangular shape, and the length of the flow passage cross-section Sa in the direction D1 along the rotary shaft 4 is longer than the length of the flow passage cross-section Sa in the direction D2 orthogonal to the rotary shaft 4. The direction D1 along the rotary shaft 4 is a direction substantially along the peripheral surface of the stator 52. By increasing the width of the region of the motor cooling portion 10a facing and at least partially surrounding the stator 52, an efficient cooling of the stator 52 can be achieved.

On the other hand, the length of the flow passage cross-section Sa of the motor cooling portion 10a in the direction D2 orthogonal to the rotary shaft 4 is shorter than the length of the flow passage cross-section Sa in the direction D1 along the rotary shaft 4. By reducing the size of the flow passage cross-section Sb caused by the formation of the motor cooling portion 10a, for example in the direction D2 orthogonal to the rotary shaft 4, the size of the motor housing 7 may also be reduced. In some examples, the flow passage cross-section Sa of the motor cooling portion 10a includes a cross-section orthogonal to the flow direction of the coolant C.

The outlet of the motor cooling portion 10a is connected or fluidly coupled to the inverter cooling portion 10b through a third connecting flow passage 75. The inverter cooling portion 10b is a flow passage which is disposed along or adjacent to an electronic control circuit board 6a of the inverter 6 and through which the coolant C flows while meandering along the control circuit board 6a. The control circuit board 6a includes, for example, an insulated gate bipolar transistor (IGBT), a bipolar transistor, a MOSFET, a GTO, or the like. The inverter 6 is cooled by the inverter cooling portion 10b. The inverter cooling portion 10b may be disposed along the control circuit 6a board for which the temperature is likely to rise, in order to efficiently cool of the inverter 6.

The outlet of the inverter cooling portion 10b is connected or fluidly coupled to an external circulation line through a fourth connecting flow passage 76. The coolant C supplied to the circulation line is cooled by a radiator or the like and is supplied to the liquid flow passage 92 of the heat exchanger 9 again.

Figure 4:
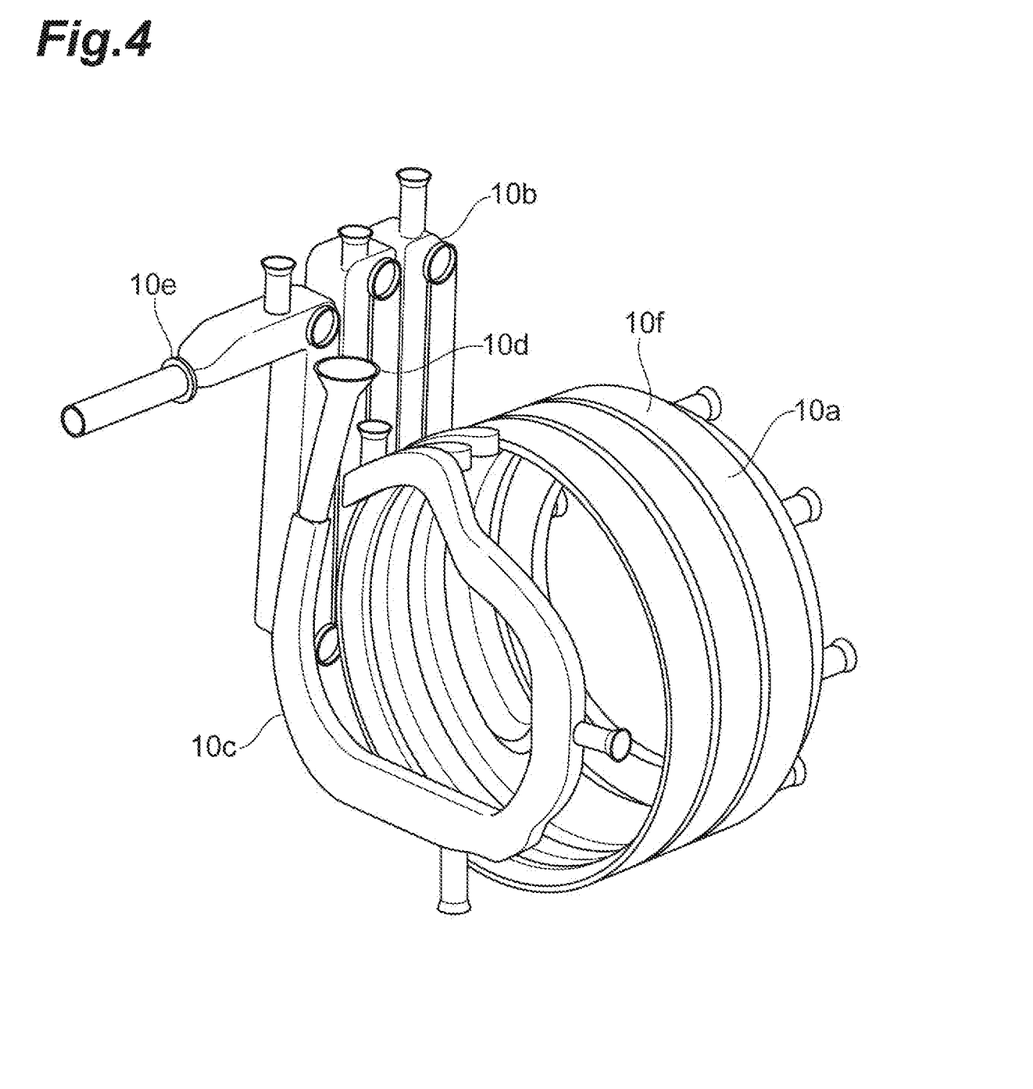
FIG. 4 is another perspective view of the refrigerant line and the air-cooling line of FIG. 3 viewed from a side opposite to the inverter.

As illustrated in FIGS. 1, 3, and 4, the inlet of the first connecting flow passage 73 includes an entry port 10d that is provided to the downstream side relative to the heat exchanger 9 and is provided to the upstream side relative to the stator 52. Further, the outlet of the fourth connecting flow passage 76 includes a discharge port 10e that is provided to the downstream side relative to the stator 52. The first connecting flow passage 73, the bearing cooling portion 10c, the second connecting flow passage 74, the motor cooling portion 10a, the third connecting flow passage 75, the inverter cooling portion 10b, and the fourth connecting flow passage 76 are provided between the entry port 10d and the discharge port 10e, in this order, from the upstream side. A flow passage between the entry port 10d and the discharge port 10e is a one-path flow passage 10f (see FIGS. 3 and 4) that directly connects the entry port 10d to the discharge port 10e by one path (a single flow path).

When the heat exchanger 9, the stator 52, the inverter 6, and the like are arranged in the flow direction of the coolant C passing through the refrigerant line 10, the heat exchanger 9 is disposed to the upstream side relative to the stator 52 and the inverter 6 is disposed on the downstream side relative to the stator 52. Furthermore, the first radial bearing 81 and the thrust bearing 83 are disposed between the heat exchanger 9 and the stator 52.

As described above, the centrifugal compressor 1 may include the compressor housing 32 that houses the compressor impeller 31, the air-cooling line 11 that extracts a part of the compressed air G present in the compressor housing 32 from the compressor housing 32, and the refrigerant line 10. The temperature of the coolant that passes through the refrigerant line 10 may be lower than the temperature of the compressed air G, and the air-cooling line 11 may be configured to exchange heat with the refrigerant line 10 in the heat exchanger 9.

The centrifugal compressor 1 may include the gas bleed port 33b which is provided closer to the discharge port 32b than the compressor impeller 31 in the flow direction in the compressor housing 32, and the air-cooling line 11 which is connected to the gas bleed port 33b and through which a part of the compressed air G compressed by the compressor impeller 31 passes. Additionally, the centrifugal compressor 1 may include the refrigerant line 10 of which at least a part is provided in the motor housing 7.

In some examples, the inside of the centrifugal compressor 1 can be cooled using the compressed air G passing through the air-cooling line 11 and the coolant C passing through the refrigerant line 10. In some examples, both the compressed air G and the coolant C are used as a refrigerant for cooling the inside of the centrifugal compressor 1 in order to achieve efficient cooling and to decrease the size of the centrifugal compressor as compared to centrifugal compressors including electric superchargers which are cooled entirely by coolant.

Additionally the motor cooling portion 10a and the bearing cooling portion 10c in the refrigerant line may be used to effectively cool the stator 52, the first radial bearing 81, and the thrust bearing 83.

Furthermore, since the flow passage cross-section Sa of the motor cooling portion 10a is longer in the direction D1 along the rotary shaft 4, the region of the motor cooling portion 10a facing the stator 52 is wider around the stator 52 in order to efficiently cool the stator 52. Moreover, the flow passage cross-section Sa of the motor cooling portion 10a around the stator 52 is shorter in the direction D2 orthogonal to the rotary shaft 4, and the flow passage cross-section Sb of the bearing cooling portion 10c around the first radial bearing 81 is shorter in the direction D1 along the rotary shaft 4 such that the size of the electric supercharger may be made compact.

Further, the refrigerant line 10 includes the entry port 10d, the discharge port 10e and the one-path flow passage 10f that connects the entry port 10d to the discharge port 10e as one path. The entry port 10d is provided to the downstream side relative to the heat exchanger 9 and is provided to the upstream side relative to the stator 52. Additionally, the discharge port 10e is provided to the downstream side relative to the stator 52. By connecting or fluidly coupling the entry port 10d and the discharge port 10e by the one-path flow passage 10f as one path, the coolant C having exchanged heat with the stator 52 and the like flows toward the downstream side without returning to the upstream side in order to provide efficient cooling.

Furthermore, the heat exchanger 9 is disposed on the upstream side relative to the stator 52 in the flow direction of the coolant C, and the inverter 6 is disposed on the downstream side than the stator 52. As a result, the stator 52 and the inverter 6 can be cooled using the coolant C having exchanged heat with the stator 52. In some examples, the stator 52 may be preferentially or selectively cooled to a greater degree than the inverter 6.

It is to be understood that not all aspects, advantages and features described herein may necessarily be achieved by, or included in, any one particular example embodiment. Indeed, having described and illustrated various examples herein, it should be apparent that other examples may be modified in arrangement and detail. We claim all modifications and variations coming within the spirit and scope of the subject matter claimed herein.

For example, the heat exchanger may be installed on the motor housing, however in other examples the heat exchanger may be located away from the motor housing.

The cooling gas line is variously illustrated or described as being connected to the bearings which are independently cooled by the cooling gas line. However, in some examples other components or surfaces for which the temperature is higher than the temperature of the compressed air passing through the cooling gas line may be cooled by the cooling gas line.

Furthermore, in some examples the centrifugal compressor may comprise an electric supercharger which does not include a turbine.

We claim:

1. A centrifugal compressor comprising:
a rotary shaft of a compressor impeller;
a motor configured to rotate the rotary shaft; a motor housing that houses the motor;
a compressor housing that houses the compressor impeller and includes a discharge port configured to discharge compressed gas which is compressed by the compressor impeller;
a gas bleed port that is fluidly coupled to the discharge port in the compressor housing; a cooling gas line which is fluidly coupled to the gas bleed port and which is configured to transport at least a part of the compressed gas;
a cooling liquid line which is at least partially located in the motor housing and which is configured to transport a cooling liquid; and
a heat exchanger that is configured to transfer heat from the cooling gas line to the cooling liquid line based at least in part on a temperature difference between the compressed gas transported through the cooling gas line and the cooling liquid which is transported through the cooling liquid line,
wherein the cooling liquid line includes a flow passage that passes by an end portion of a stator of the motor and is at least partially wound around the circumference of a bearing that supports the rotary shaft.

2. The centrifugal compressor according to claim 1,
wherein the cooling liquid line includes a first flow passage that is at least partially wound around the stator, and
wherein the flow passage that passes by the end portion of the stator is a second flow passage of the cooling liquid line.

3. The centrifugal compressor according to claim 2,
wherein a length of a first cross-sectional flow area of the first flow passage in a first direction along the rotary shaft is longer than a length of the first cross-sectional flow path in a second direction orthogonal to the rotary shaft, and
wherein a length of a second cross-sectional flow path of the second flow passage in the first direction is shorter than a length of the second cross-sectional flow path in the second direction.

4. The centrifugal compressor according to claim 2,
wherein the cooling liquid line includes an entry port that is fluidly coupled to a discharge port by a single flow path that connects the entry port to the discharge port.

5. The centrifugal compressor according to claim 4,
wherein the first flow passage that is at least partially wound around the stator is fluidly coupled to and located between the entry port and the discharge port along the single flow path.

6. The centrifugal compressor according to claim 2, further comprising an inverter configured to control a rotation of the motor,
wherein the cooling liquid line includes an inverter cooling portion that is configured to cool the inverter, and
wherein the first flow passage that is at least partially wound around the stator is fluidly coupled to and located between the heat exchanger and the inverter cooling portion along the cooling liquid line.

7. The centrifugal compressor according to claim 6,
wherein the inverter comprises an electronic control circuit board, and
wherein the inverter cooling portion is configured to cool the electronic control circuit board.

8. The centrifugal compressor according to claim 2,
wherein the motor housing comprises a stator housing that houses a stator of the motor, and
wherein the first flow passage that is at least partially wound around the stator is located in the stator housing.

9. The centrifugal compressor according to claim 8,
wherein the bearing comprises a radial bearing that is located between the motor and the compressor impeller, and
wherein the second flow passage at least partially surrounds the radial bearing.

10. The centrifugal compressor according to claim 9,
wherein the motor housing additionally comprises a bearing housing that houses the radial bearing, and
wherein the second flow passage is located in the bearing housing.

11. A centrifugal compressor comprising:
a compressor housing that houses a compressor impeller including a discharge port configured to discharge compressed gas which is compressed by the compressor impeller;
a cooling gas line that is fluidly coupled to the discharge port and is configured to extract a part of the compressed gas that is discharged from the compressor housing;
a cooling liquid line configured to transport cooling liquid;
a heat exchanger that is configured to transfer heat from the cooling gas line to the cooling liquid line based at least in part on a temperature difference between the compressed gas extracted by the cooling gas line and the cooling liquid transported through the cooling liquid line;
a rotary shaft of the compressor impeller;
a motor configured to rotate the rotary shaft; and
a motor housing that houses the motor,
wherein the heat exchanger is mounted to the motor housing.

12. The centrifugal compressor according to claim 11,
wherein the cooling liquid line includes a flow passage that is at least partially wound around a stator of the motor.

13. The centrifugal compressor according to claim 12, further comprising an inverter,
wherein the cooling liquid line includes an inverter cooling portion that is configured to cool the inverter, and
wherein the flow passage is fluidly coupled to and located between the heat exchanger and the inverter cooling portion along the cooling liquid line.

14. The centrifugal compressor according to claim 12,
wherein the motor housing comprises a stator housing that houses the stator, and
wherein the flow passage is located in the stator housing.

15. The centrifugal compressor according to claim 12,
wherein a length of a cross-sectional flow area of the flow passage in a first direction along the rotary shaft is longer than a length of the cross-sectional flow path in a second direction orthogonal to the rotary shaft.

16. The centrifugal compressor according to claim 12,
wherein the cooling liquid line includes an entry port that is fluidly coupled to a discharge port by a single flow path that connects the entry port to the discharge port, and
wherein the flow passage is fluidly coupled to and located between the entry port and the discharge port along the single flow path.

17. The centrifugal compressor according to claim 11, wherein the cooling liquid line includes a flow passage that passes by an end portion of a stator of the motor and is at least partially wound around the circumference of a bearing that supports the rotary shaft.

18. The centrifugal compressor according to claim 17, wherein a length of a cross-sectional flow path of the flow passage in a first direction along the rotary shaft is longer than a length of the cross-sectional flow path in a second direction orthogonal to the rotary shaft.

19. The centrifugal compressor according to claim 17, wherein the bearing comprises a radial bearing that is located between the motor and the compressor impeller,
wherein the motor housing comprises a bearing housing that houses the radial bearing, and
wherein the flow passage is located in the bearing housing.

20. A centrifugal compressor comprising:
a rotary shaft of a compressor impeller configured to generate compressed gas;
a motor configured to rotate the rotary shaft;
a cooling gas line configured to transport at least a part of the compressed gas; and
a cooling liquid line configured to exchange heat with the cooling gas line and including a flow passage that passes by an end portion of a stator of the motor and is at least partially wound around the circumference of a bearing that supports the rotary shaft.

21. The centrifugal compressor according to claim 20, further comprising:
a motor housing that houses the motor; and
a heat exchanger configured to transfer the heat from the cooling gas line to the cooling liquid line based at least in part on a temperature difference between the compressed gas transported through the cooling gas line and cooling liquid which is transported through the cooling liquid line,
wherein the heat exchanger is mounted to the motor housing.

22. The centrifugal compressor according to claim 20, wherein the cooling liquid line further includes another flow passage that is at least partially wound around the stator.

* * * * *